United States Patent [19]

Ravagnani et al.

[11] 4,324,281

[45] Apr. 13, 1982

[54] METHOD, COMPOSITION AND PRODUCT EMPLOYING A TETRACARBOXYLIC DIANHYDRIDE TO IMPROVE ADHESION BETWEEN A METAL MEMBER AND A CONTIGUOUS RUBBER SKIM STOCK

[75] Inventors: Frederick J. Ravagnani, Uniontown; Steven E. Schonfeld, Akron, both of Ohio

[73] Assignee: The Firestone Tire & Rubber Company, Akron, Ohio

[21] Appl. No.: 139,302

[22] Filed: Apr. 11, 1980

[51] Int. Cl.³ .......................... B60C 1/00; B29H 9/02; C09J 3/00; C08K 5/09

[52] U.S. Cl. .................. 152/359; 156/110 A; 156/330; 428/462; 428/465; 428/418; 524/112

[58] Field of Search ............... 152/330 R, 356 R, 359; 156/110 A, 110 C, 110 MD, 124, 330; 428/462, 465, 470, 414, 418; 260/3, 23.7 M, 31.2 R, 31.2 T, 31.4 EP, 31.8 E, 32.8 EP, 33.6 EP, 37 EP, 45.85 T; 526/335

[56] References Cited

U.S. PATENT DOCUMENTS

| | | | |
|---|---|---|---|
| 3,715,266 | 2/1973 | Winters et al. | 428/465 |
| 3,847,727 | 11/1974 | Kindle et al. | 152/359 |
| 3,948,849 | 4/1976 | Barie, Jr. | 260/37 EP |
| 4,022,732 | 5/1977 | Schwarcz | 525/153 |
| 4,041,004 | 8/1977 | Barie, Jr. et al. | 260/33.6 EP |

OTHER PUBLICATIONS

Skeist, Irving, *Epoxy Resins*, Reinhold Publishing Corp., 1958, Chapter 3, pp. 21–58.

*Primary Examiner*—Edward C. Kimlin
*Assistant Examiner*—Lois E. Boland

[57] ABSTRACT

This invention is directed to a method, a rubber skim stock and a product containing the skim stock having improved adhesion between a metal member and contiguous rubber skim stock. The invention lies in the discovery that improved rubber-to-metal adhesion can be obtained by adding to an otherwise conventional rubber skim stock composition appropriate amounts of a tetracarboxylic dianhydride.

The method of this invention comprises the steps of mixing a tetracarboxylic dianhydride into a rubber composition, bringing this composition into contiguous relationship with a metal member in an unvulcanized product and vulcanizing the product to yield the end product.

9 Claims, No Drawings

METHOD, COMPOSITION AND PRODUCT EMPLOYING A TETRACARBOXYLIC DIANHYDRIDE TO IMPROVE ADHESION BETWEEN A METAL MEMBER AND A CONTIGUOUS RUBBER SKIM STOCK

BACKGROUND OF THE INVENTION

In the production of rubber articles such as hose, pneumatic tires or power transmission belts such as V-belts, toothed positive drive belts, etc., it is generally necessary to reinforce the rubber or elastomeric product. In the past, textile materials have been employed for this purpose. However, wire cord has been found to be more desirable under certain conditions of use, for example, in pneumatic tires of the radial ply type. Maximum reinforcement of the rubber is obtained when maximum adhesion is produced and retained between the laminate of rubber and the metal reinforcing element as used to form a unitary structure. Of equal importance is the requirement that, for example, the laminate of the reinforcing metal element and rubber remain in a bonded relationship with each other throughout the useful life of the reinforced structure in which the laminate is used.

PRIOR ART

In U.S. Pat. No. 3,517,722 to Endter et al., a rubber-metal adhesion system is described which involves formation of a resorcinol-formaldehyde resin at the interface between the rubber and the metal, thereby bonding these members together. In forming the resin, compounds capable of liberating the methylene precursor are added to resorcinol in the rubber stock. Upon vulcanization, the methylene and resorcinol react to form the resorcinol-formaldehyde resin.

According to U.S. Pat. No. 3,846,160, the adhesion force between steel cord and rubber is enhanced by applying a mineral oil solution containing, for example, an organic acid salt of a higher aliphatic amine to zinc plated or brass plated steel cord.

The adhesion of rubber to metal such as wire tire cord is improved according to U.S. Pat. No. 3,847,727 by incorporating a halogenated quinone and the condensation product of resorcinol and acetaldehyde in the rubber prior to application to the metal and vulcanization of the composite.

The disclosure of U.S. Pat. No. 3,903,026 teaches the preparation of a rubber composition having improved metal adhesion properties even after thermal aging; this is disclosed to be achieved by compounding cobalt carboxylate, magnesium oxide (0.1 to 4 phr) and rubber.

Rubber Age, October 1975, pages 31 to 36, "Evaluation of Resotropin" by Cunningham and Hart. Resotropin, the reaction product of equimolar quantities of resorcinol and hexamethylene tetramine, is disclosed to be a rubber adhesion promoter for use with brassed steel wire cord. Improved cure, including higher degrees of cure are alleged to be achieved with equal scorch resistance.

U.S. Pat. No. 4,022,732 discloses, in part, the preparation of reaction products of tetracarboxylic dianhydrides and primary polyamides and their use as release agents in the manufacture of pressure-sensitive adhesive tapes.

U.S. Pat. No. 4,041,004 discloses (including references cited therein) the preparation and use of tetracarboxylic dianhydrides (and other dianhydrides) as hardening agents with selected polyepoxides used to prepare reinforced laminates.

To achieve satisfactory rubber-to-metal bonding, numerous methods have been developed. For example, U.S. Pat. No. 2,720,479 describes a system wherein a phenolic resin and a brominated isoolefin-polyolefin interpolymer are dissolved in a suitable liquid carrier and the resulting adhesive composition is spread on rubber which is to be bonded to metal. The rubber and metal are subsequently pressed together and vulcanized. U.S. Pat. No. 2,581,920 also describes the use of halogenated polymers to bond rubber to metal.

It is common practice in the art to increase the strength of rubber products such as a rubber belt or a pneumatic tire by incorporating therein a zinc plated or a copper-zinc (brass) alloy plated steel cord. Such prior art rubber-steel cord composites must retain satisfactory adhesion of the steel cord to the vulcanized rubber, particularly when such skim stock steel cord composite has been stored for a long period of time in a humid atmosphere prior to fabrication with the rubber.

The rubber component can be a single component or a blend of one or more rubbers. Rubbers that can be utilized include natural rubbers, synthetic rubbers and blends thereof. The particular rubber composition selected is not critical and can be selected from, for example, natural rubber, synthetic polyisoprene, SBR and polybutadiene. The extender oil, when utilized can be, for example, any known medium process oil, aromatic or naphthenic hydrocarbon derived.

The antioxidant selected is not critical; it can be, for example, N-(1,3-dimethyl butyl)-N'-phenyl-p-phenylenediamine, known in the trade as Santoflex 13; or, 6-dodecyl-1,2-dihydro-2,4-trimethyl quinoline, known in the trade as Santoflex DD, sold by Monsanto Chemical Company. Dibutyl-p-cresol and quinones can also be used.

Accelerators that can be utilized include:
Altax benzothiazyl disulfide by R. T. Vanderbilt Company
NOBS Special N-oxydiethylene benzothiazole 2-sulfenamide by American Cyanamid Company
VULKACIT DZ N,N-dicyclohexyl-2-benzothiazyl sulfenamide by Mobay Chemical Company Any known rubber reinforcing carbon black can be used, such as HAF carbon black and the curative means can be that achieved through use of sulfur, peroxide or irradiation. Typical peroxides that can be utilized include dicumyl peroxide and 2,5-dimethyl-2,5-di(t-butyl peroxy)-hexane.

DESCRIPTION OF THE INVENTION

This invention relates to a method, a rubber skim stock and a product containing the skim stock wherein the invention yields improved adhesion between a contiguous rubber skim stock and a metal member. The invention lies in the discovery that improved rubber-to-metal adhesion can be obtained by adding to an otherwise conventional rubber skim stock composition, wherein said cured rubber skim stock of conventional composition does not include an epoxy resin adhesive, appropriate amounts of a tetracarboxylic dianhydride.

The method of this invention comprises the steps of mixing the selected dianhydride into a rubber composition, as described below, bringing this composition into contiguous relationship with at least one metal member in an unvulcanized product and vulcanizing the product to yield the end product.

The skim stock of the present invention can be applied by use of calendering means, spray means or other known application techniques. Areas of significant utility include, but are not limited to, radiator hose, pneumatic tires, air ride springs, metal reinforced products such as rubber bumpers and sporting goods grips such as golf club handles; in each of these representative areas of utility, our skim stock composition can be used to increase adhesion retention properties between brass coated metal and rubber.

Our preferred dianhydride adhesion retention promoter is 3,3'-4,4'-benzophenone tetracarboxylic dianhydride; this compound is supplied by the Gulf Oil Chemicals Company, Houston, Tex. and has the following structure:

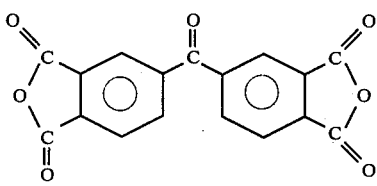

it is known by the designation BTDA.

DETAILED DESCRIPTION OF THE INVENTION

The following Examples are representative and composition component parts are expressed in parts per hundred rubber, phr, unless otherwise specified.

EXAMPLE I

The following composition was blended in a 1100 cc. Banbury mixer for about 7 minutes with a final Banbury temperature of 325° F.
(1) 100 phr natural rubber
(2) 50 phr carbon black
(3) 7.5 phr zinc oxide
(4) 3 phr antioxidant (1,3-dimethyl butyl)-N'-phenyl-p-phenylenediamine
(5) 0.5 phr stearic acid
(6) 3.3 phr extender oil, and
(7) 2 phr resorcinol.

The masterbatch resulting from the preceding blending was then roll mill mixed with the following composition at a temperature below 220° F.
(a) 2.8 phr sulfur
(b) 1.0 phr N-(cyclohexylthio)-phthalalimide as retarder
(c) 0.6 phr N-oxydiethylene-benzothiazole-2-sulfenamide as accelerator
(d) 4.0 phr BTDA as adhesion retention promoter
(e) 0.7 phr extender oil, and
(f) 2.2 phr 95/5 hexamethylenetetramine/stearic acid preblend.

T-adhesions to brass coated wire for the resulting mill mix were determined at 230° F. The samples were cured 30' at 300° F. Percent coverage* was determined visually. The control of Table I was the above masterbatch which had been roll mill mixed without BTDA.

TABLE I

|  | Control | Control +4 phr BTDA |
| --- | --- | --- |
| Monsanto Rheometer - 300° F. | | |
| Time to TS (2) | 5.3 | 5.3 |
| Time to TC (90) | 20.7 | 26.2 |
| Ultimate Torque, dN . M | 50.1 | 45.0 |
| R. T. Ring Tensile - 23' Cure | | |
| 300% Modulus, (PSI) | 3070 | 2520 |
| Tensile Strength, (PSI) | 3190 | 2850 |
| Elongation, (%) | 310 | 330 |
| R. T. Ring Tensile - 23' Cure - Aged 4 Days at 212° F. | | |
| Tensile Strength, (PSI) | 2000 | 1580 |
| Elongation, (%) | 150 | 160 |
| Firestone Flexometer ASTM D 623/Method B | | |
| Initial Shore A | 75 | 71 |
| Hot Shore A | 71 | 65 |
| % Deflection | 10.7 | 13.3 |
| Running Temp., (°F.) | 225 | 225 |
| T-Adhesion to W152 Brass at 230° F. | | |
| Unconditioned | 135 (90)* | 96 (70)* |
| Steam Bomb - 1 Hr., 300° F. | 111 (80) | 154 (100) |
| Humidity Chamber - 14 Days | 54 (20) | 92 (70) |
| 30 Days | 26 (0) | 100 (70) |
| 60 Days | 28 (0) | 109 (70) |
| 90 Days | 37 (0) | 82 (30) |
| 120 Days | 40 (0) | 78 (50) |
| 180 Days | 31 (0) | 101 (70) |

This Example I composition components can be varied within the following ranges:

| | |
| --- | --- |
| Masterbatch | 100 parts rubber<br>20 to 90 phr carbon black<br>0 to 20 phr extender oil<br>1 to 12 phr zinc oxide<br>0.1 to 5 phr antioxidant<br>0 to 5 phr stearic acid<br>.1 to 5 phr resorcinol |
| Mill Mix | 0 to 10 phr sulfur<br>0.1 to 3 phr N-(cyclohexylthio) phthalimide<br>1 to 5 phr 95/5 hexamethylene tetramine/stearic acid preblend<br>0.2 to 5 phr N-oxydiethylene benzothiazole 2-sulfenamide<br>0.5 to 15 phr of, for example, BTDA as dianhydride, and<br>0.3 to 2.0 phr extender oil. |

EXAMPLE II

The following formulation was blended in an 1100 cc Banbury mixer as in Example I:
(1) 100 phr natural rubber
(2) 50 phr carbon black as reinforcing agent
(3) 4 phr extender oil as processing aid
(4) 7.5 phr zinc oxide as activator and reinforcing pigment
(5) 0.5 phr stearic acid as internal lubricant and stabilizer
(6) 3 phr antioxidant (1,3-dimethyl butyl)-N'-phenyl-p-phenylene-diamine, and
(7) 2 phr resorcinol.

The masterbatch resulting from this Banbury mixing was then roll mill mixed with 2.8 phr sulfur as curative, 0.7 phr extender oil, 0.6 phr N-oxy-diethylene benzothiazole 2-sulfenamide as accelerator, 2.2 phr of a 95/5 hexamethylene tetramine/stearic preblend, 4 phr (BTDA) as adhesion retention promoter for brass coated wire and 0.3 phr N-(cyclohexylthio)-phthalimide as retarder.

The masterbatch, as mill mixed, is herein defined as the final mill mix. The product was cured for 23 minutes at 300° F.

TABLE II

167 PHR of the masterbatch of Example II above was part of each mill mixed composition "A", "B" and "C" of this Table II.

|  | A | B | C |
|---|---|---|---|
| 95/5 Hexamethylene tetramine/ stearic acid preblend | 2.2 | 2.2 | 2.2 |
| 80/20 Sulfur/oil preblend | 3.5 | 3.5 | 3.5 |
| Nobs Special | .6 | .6 | .6 |
| Santogard PVI | .3 | .3 | .3 |
| BTDA | — | 2. | 9. |
| Total Parts | 173.6 | 175.6 | 182.6 |
| Monsanto Rheometer 300° F. 140 rpm 1° Arc | | | |
| Scorch time (min. to TS (2) | 5.7 | 6.0 | 5.8 |
| Min. to Optimum cure (T(90)) | 16.3 | 22.8 | 19.6 |
| Max. torque (Decinewton-meters) | 43.0 | 43.5 | 33.4 |
| Ring Tensile @ R.T. Slabs cured 23' @ 300° F. | | | |
| Modulus @ 300% elong. (psi) | 2520 | 2170 | 1650 |
| Tensile strength @ break (psi) | 2890 | 2710 | 2120 |
| Ultimate elongation (%) | 340 | 360 | 360 |
| Tests on Compression Set Buttons Cured 30' @ 300° F. | | | |
| Shore A | | | |
| @ 73° F. | 68 | 67 | 63 |
| @ 212° F. | 68 | 64 | 59 |
| % Steel Ball Rebound | | | |
| @ 73° F. | 57 | 57 | 57 |
| @ 212° F. | 75 | 74 | 67 |
| T Adhesion to 1 × 5 Wire (w152) @ 230° F., Samples Cured 30' @ 300° F. | | | |
| To brass plated, unconditioned | 168(100)* | 143(100)* | 122(100)* |
| To brass plated, after 1 hr. in 300° F. steam | 57(<50) | 85(<50) | 109(100) |

*coverage visually determined

This Example II composition components can be varied within the following practical ranges:

| | |
|---|---|
| Masterbatch | 100 parts rubber<br>20–90 phr carbon black<br>0–20 phr extender oil<br>3–12 phr zinc oxide<br>0.1 to 5 phr antioxidant<br>0.5 to 10 phr resorcinol<br>0 to 5 phr stearic acid |
| Mill Mix | 1.0 to 10 phr curative<br>0.1 to 20 phr extender oil<br>0.2 to 5 phr accelerator<br>0.5 to 10 phr hexamethylene tetramine/stearic acid mixture ratio approx. 95/5<br>0.1 to 3 phr retarder |

Polymeric reinforcing resins that can be incorporated into our skim stock composition to improve the modulus properties of our cured stock can be added together with an extender oil, preferably medium process, if needed to maintain processability. Specific polymeric reinforcing resins that can be utilized in the practice of our invention include the phenol-formaldehyde resins, hexamethylenetetramine-formaldehyde, urea-formaldehyde and the like as illustrated in, for example, J. K. Stille, Introduction to Polymer Chemistry, John Wiley & Sons, Inc., 1962, Section 6.3, pages 102 to 106. Our preferred polymeric resin is the 1:1 molar reaction product of resorcinol and hexamethylenetetramine known also as "resotropin". Selected mixtures of more than one of such polymeric resins can be utilized.

EXAMPLE III

A masterbatch was prepared by mixing, in an 1100 cc. Banbury mixer the following formulation for about 7 minutes with a final Banbury temperature of 325° F. The stock was then final milled on a mill at a temperature below 220° F. The addition of the resotropin and BTDA adhesion promoter was done on the final mill.

Masterbatch Formulation:

(1) 100 parts natural rubber
(2) 50 phr carbon black as reinforcing agent
(3) 4 phr extender oil as processing aid
(4) 7.5 phr zinc oxide as activator and reinforcing pigment
(5) 0.5 phr stearic acid as internal lubricant stabilizer
(6) 3 phr antioxidant (1,3-dimethylbutyl)-N'-p-phenylenediamine)

The masterbatch resulting from this Banbury mixing was then roll mill mixed with 2.8 phr sulfur as curative, 0.7 phr extender oil, 0.9 phr N-oxy-diethylene benzothiazole 2-sulfenamide as accelerator, 2.2 phr resotropin, 4 phr BTDA as adhesion retention promoter for brass coated wire and as retarder, 0.3 phr N-(cyclohexylthio)-phthalimide; the sulfur and extender oil were mill mixed as an 80/20 sulfur/oil preblend.

In Table III which follows, the masterbatch was present at 161 parts for each experiment; the mill mix components were as above designated.

TABLE III

|  | Control | A | B | C |
|---|---|---|---|---|
| Masterbatch of Example III | 161 | 161 | 161 | 161 |
| Resotropin | 2.2 | 2.2 | 2.2 | 2.2 |
| Retarder of Example III | .3 | .3 | .3 | .3 |
| 80/20 sulfur/oil preblend | 3.5 | 3.5 | 3.5 | 3.5 |
| Accelerator of Example III | .9 | .9 | .9 | .9 |
| BTDA | — | 2. | 4. | 6. |
| Total Parts | 167.9 | 169.9 | 171.9 | 173.9 |
| Monsanto Rheometer 300° F. 100 rpm 1° Arc | | | | |
| Scorch time (min. to TS (2)) | 5.7 | 7.0 | 7.3 | 6.9 |
| Min. to opt. cure Min. to TD(90) | 17.7 | 21.8 | 16.6 | 17.0 |
| Max. torque DN . M | 50.1 | 43.1 | 38.4 | 37.2 |
| Room Temp. Ring Tensile slabs cured 23' @ 300° F. | | | | |
| Modulus @ 300% elongation (psi) | 2740 | 2180 | 2030 | 1900 |
| Tensile @ break (psi) | 3120 | 2830 | 2500 | 2420 |
| Ultimate elongation (%) | 330 | 370 | 360 | 360 |
| 23' @ 300° F. slabs after aging 4 days in 212° F. oven | | | | |

TABLE III-continued

|  | Control | A | B | C |
|---|---|---|---|---|
| Modulus @ 100% elongation (psi) | 910 | 720 | 650 | 600 |
| Tensile @ break (psi) | 930 | 1210 | 1310 | 1170 |
| Ultimate elongation (%) | 100 | 150 | 180 | 170 |
| T-Adhesion to Brass Plated 1 × 5 (w152) Wire @ 230° F., test pieces Cured 30' @ 300° F. | | | | |
| Unconditioned | 141(100)* | 122(80)* | 111(60)* | 103(50)* |
| After 1 hr. in 300° F. steam | 124(80) | 125(80) | 125(90) | 125(90) |
| After Conditioning in the Cured State in 90% R.H., 95° F. | | | | |
| 14 days | 69(30) | 123(80) | 101(70) | 102(60) |
| 1 month | 50(0) | 115(50) | 101(60) | 91(40) |
| 2 months | 52(0) | 109(60) | 93(40) | 87(30) |
| 3 months | 57(0) | 119(60) | 112(70) | 99(70) |
| 4 months | 65(0) | 116(60) | 110(60) | 109(80) |
| 5 months | 49(0) | 95(60) | 117(70) | 115(80) |

*% coverage as visually determined

This Example III can be varied within the following practical composition component ranges:

| | |
|---|---|
| Masterbatch | 100 parts rubber<br>20-90 phr carbon black<br>0-20 phr extender oil<br>3-12 phr zinc oxide<br>0.1 to 5 phr antioxidant<br>0 to 5 phr stearic acid |
| Mill Mixed | 1.0 to 10 phr curative<br>0 to 3 phr retarder<br>0.2 to 5 phr accelerator<br>0.1 to 15 phr of dianhydride<br>0.5 to 12 phr polymeric reinforcing resin |

Mill mixing was carried out into the masterbatch on a two roll 20" mill followed by sheeting out the product at a thickness of 60 gage for adhesion testing. The product was cured for 23 minutes at 300° F.

The retarder component functions as a prevulcanization inhibitor and can be, for example, Santogard PVI by Monsanto, N-(cyclohexylthio)-phthalimide.

The testing of our stabilized and adhesion retaining skim stocks was done on T-adhesion pads prepared by placing 60 gage slabs of uncured skim stock on 51 gage fiber reinforced backing. Sample width was ½ inch. Clean brass coated wires were placed between two pads of the reinforced skim stock with the wires in contact with the uncured skim at ½ inch intervals. The pads were placed in a mold and were cured for 30 minutes at 300° F. Testing was done on an Instron Universal Tester at 10 inches per minute and 230° F. Steam bomb aging of the samples was one in a pressure tight bomb at 1 atmosphere pressure, 300° F., and a saturated steam atmosphere.

DETAILED T-ADHESION TEST PROCEDURE

1. Using a Clicker machine and a 6×½ inch die, prepare an adequate number of calendered and control stock samples for pad building.
2. Use one piece of calendered fabric backing (0.051").
3. Ply one piece of control rubber stock (0.060") onto the fabric backing.
4. Place sample in building jig with fabric side down.
5. Place ten cords (of brass coated wire) approximately 7" in length equally spaced on top of the two piece assembly.
6. Invert another 2 ply assembly, made as in items 1, 2 and 3, on top of cords so that cords are between 2 layers of stock to be tested.
7. This assembly should now fit snugly into the mold.
8. Adhesion pads shall be cured for 30 minutes at 300° F. and then allowed to equilibrate for 24 hours.
9. Testing Machine: 1130 Instron Universal Tester.
10. Test speed 10"/minute; temperature 230° F. after 20' preheat.
11. The top grip shall be of a special holder made for the cured sample, with a slot in the bottom to permit the sample to be inserted with the wire protruding. The bottom grip shall be a wedge type, designed to exert increasing tightening as the wire is pulled.
12. Record 10 pulls and average. Multiply by 2 to get lbs. per inch.

The preceding Examples can be varied within the scope of our total specification disclosure, as it would be understood and practiced by one skilled in the art, to achieve essentially the same results. Equivalent reactants can be used, for example, the selected tetracarboxylic dianhydride is not critical; it can be any of those designated in U.S. Pat. No. 4,041,004; however, the use of 3,3'4,4'benzophenone tetracarboxylic dianhydride is preferred.

When our skim stock is used in the conventional steel cord tire construction, for example, it is extremely important that the bond between the rubber ply stock and the wire fabric also be as flexible and as strong as possible for efficient use under operating conditions; this is especially important in the case of truck tires which are subjected to high loads and speeds with consequent heat buildup due to the rapid flexing of the plies.

Our invention is further directed to a tire having steel reinforcing elements imbedded in a vulcanized rubber skim stock as heretofore exemplified.

Compounding ingredients customarily employed in the rubber compounding art can be added to our skim stock composition and include accelerators, antioxidants, bactericides and the like, color pigments, extenders, reinforcing pigments, softeners, vulcanizing agents, etc. The compounding ingredients are used in the amounts necessary to achieve the desired properties in the resulting vulcanizate as is well known to those skilled in the art.

The present invention also finds utility in, for example, brassed metal-rubber articles such as motor mounts, cutless bearings, torsilastic springs, power belts, printing rolls, metal wire reinforced or braided hose, electrical deicers, shoe heels and wherever it is desired to secure rubber to metal to provide a flexible and strong bond between the same.

The wire coated in the practice of our invention can be, for example, brass plated wire, i.e., 70% Cu, 30%

Zn. The wire can be in the form of a strand, mat, web, ply or braid.

What is claimed is:

1. In a cured rubber skim stock of conventional composition, wherein said cured rubber skim stock of conventional composition does not include an epoxy resin adhesive said stock being bonded to at least one metal member contained within said stock, the improvement wherein from 0.5 to 15 phr of a tetracarboxylic dianhydride is incorporated into said stock prior to curing.

2. The composition of claim 1 having 0.5 to 15 phr of 3,3',4,4'benzophenone tetracarboxylic dianhydride.

3. A composition according to claim 1 wherein said curing is achieved by vulcanization.

4. In a method for improving the adhesion of a cured rubber skim stock of conventional composition, wherein said cured rubber skim stock of conventional composition does not include an epoxy resin adhesive, to at least one metal member contained within said stock, the improvement wherein from 0.5 to 15 phr of a tetracarboxylic dianhydride is incorporated into said stock prior to curing.

5. The method of claim 4 wherein from 0.5 to 15 phr of 3,3',4,4'benzophenone tetracarboxylic dianhydride is incorporated into said stock prior to curing.

6. The method of claim 4 wherein said curing is achieved by vulcanization.

7. A tire having improved adhesion between a cured rubber skim stock of conventional composition, wherein said cured rubber skim stock of conventional composition does not include an epoxy resin adhesive, and metal reinforcing members imbedded therein, the improvement wherein from 0.5 to 15 phr of a tetracarboxylic dianhydride has been incorporated into said stock prior to curing.

8. A tire according to claim 7 wherein said curing is achieved by vulcanization.

9. The tire of claim 7, wherein said composition contains 0.5 to 15 phr of 3,3',4,4'benzophenone tetracarboxylic dianhydride.

* * * * *